Sept. 24, 1968 N. LAZARCHICK, JR., ET AL 3,403,291

INTENSITY CONTROL CIRCUIT

Filed July 16, 1964 2 Sheets-Sheet 1

INVENTORS
NICHOLAS LAZARCHICK JR.
ROBERT A. THORPE
BY Joseph J. Connestor
ATTORNEY United States Patent Office 3,403,291
Patented Sept. 24, 1968

3,403,291
INTENSITY CONTROL CIRCUIT

Nicholas Lazarchick, Jr., Hyde Park, and Robert A. Thorpe, Poughkeepsie, N.Y., assignors to International Business Machines Corporation, New York, N.Y., a corporation of New York Filed July 16, 1964, Ser. No. 383,027
10 Claims. (Cl. 315—30)

ABSTRACT OF THE DISCLOSURE

In a cathode ray tube display system, a control system is provided for uniform intensity in a constant time variable velocity display. A control potential varying in amplitude as a function of the length of a vector to be displayed is used to control a current generator whereby the resultant beam current is proportional to the vector length. This beam current is amplified and applied through a feedback loop to the circuit input to effectively increase the input impedance by the amplification factor of the amplifier. The resultant system is enabled to operate with low level input signals such as provided by a data processor and provides linear transfer characteristics over a wide frequency bandwidth under direct computer control irrespective of individual cathode ray tube characteristics.

The present invention relates to a current generating circuit and more particularly to a circuit for generating a current linearly related to a control voltage.

In a cathode ray tube display, recording is accomplished when the electron beam from the cathode ray tube strikes selected elemental areas of the light emitting fluorescent layer on the inner surface of the tube's face plate. As the beam sweeps across the screen of the cathode ray tube, impingement of the electrons on the fluorescent screen of the tube produces a moving spot of light which traces out visible lines, hereinafter designated vectors, during intervals designated as the trace or writing interval.

One of the problems associated with cathode ray tube displays is that of obtaining uniform display intensity. Basically, there are two types of intensity control systems, constant time and constant intensity; the constant time systems imply variable intensity, while the contsant intensity systems imply variable time. In a CRT display associated with a control device as, for example, a data processing system or computer, the constant time system has certain advantages. By having the capability of specifying the precise time required to generate a vector or trace on a CRT irrespective of its length, the control device can operate with a synchronous clock system, its normal operating mode, thus eliminating timing problems which would be involved in a constant intensity variable time system. With a constant time system, the end points of the vectors to be displayed can be stored in digital form in a memory device and read out under computer control at specified intervals to generate a vector display. However, because the distance the beam travels will vary from zero to some maximum length in a fixed time interval, the velocity at which the beam travels will be directly proportional to the distance while the beam intensity will be inversely proportional to the distance.

In a constant time display system as above described, the input signal, designated the control signal, is a voltage waveform proportional in amplitude to the length or velocity of the vector. Assuming the beam intensity to be directly proportional to the beam current, the beam current must be controlled as a function of velocity in order that the instantaneous light output from the line traced upon the cathode ray tube phosphor remains constant.

However, in conventional cathode ray tube display circuits, the relationship between beam velocity and intensity is non-linear. Thus it is desirable to provide an intensity control system wherein the beam intensity is directly proportional to the beam velocity, i.e., the beam current is proportional to the control signal representative of beam velocity.

Intensity control systems of the prior art generally employ nonlinear function generators to compensate for the lack of linearity between the beam velocity and intensity. One known prior art method employed to provide relatively constant CRT intensity over a wide range of beam velocities was to differentiate the deflection current waveform, generally a ramp, to produce a signal generally proportional to the rate of change or velocity of the beam. These signals, one for the horizontal and one for the vertical deflection, were then applied to a function generator to produce a signal proportional to the vector sum of the X and Y velocity components. This signal, in turn, was applied to a second function generator to produce a nonlinear signal to compensate for the nonlinear transfer characteristic of the CRT. However, the use of differentiating circuits in the above-described manner produced a system which was extremely sensitive to noise. A combination of circuit delay and limited band width resulted in poor rise time characteristics on the intensity pulse which, in turn, produced shading on the leading edge of a vector displayed on the CRT. Other known prior art methods to provide constant intensity in cathode ray tube displays generate a nonlinear signal that cancels or compensates for the transfer characteristics of the CRT, resulting in a substantially linear transfer. However, in these systems, frequent adjustment of the function generator is required because of variations in the transfer characteristic of the CRT from one tube to another. Finally, because of the extremely low current involved, no known prior art intensity control system has been able to produce or maintain a linear light output under high frequency operation.

In accordance with the present invention, there is provided a novel circuit configuration for generating a current proportional to a control voltage. In the preferred embodiment herein described, a beam current in a CRT display is generated proportional to the control signal defining the length of the vector to be generated. Thus the intensity of the beam current is controlled as a function of the beam velocity, thereby affording a substantially uniform display intensity irrespective of the length or velocity of the vector. By providing a circuit which maintains such a linear relationship, the disadvantages arising from the relatively complex nonlinear function generators are eliminated. The circuit configuration employed includes an amplifier interconnected between the control voltage and the CRT control grid, and a feedback loop which samples the current in the cathode of the CRT and compares this current with the input signal. By employing cathode degeneration in the cathode circuit of the CRT in combination with the feedback amplifier, the effective impedance to the input signal is increased by a desired multiple by the amplification factor of the feedback amplifier, thus providing a desired high input impedance while obviating the disadvantages of a high cathode resistance. Accordingly, the present invention provides a circuit having linear transfer characteristics and operative over a wide frequency bandwidth. The use of a logically derived intensity signal proportional to velocity results in a much lower noise level and a more precisely shaped pulse and eliminates the need for individual circuit adjustment due to variation in the CRT transfer characteristics. The subject invention effectively uses incremental length information for intensity control which, in the environment herein described, may be digitally expressed. The use of an amplifier and cathode degeneration in the feedback circuit results in a circuit arrangement in which the beam current is linearly related to the control voltage, permits ready interhcange between cathode ray tubes without adjustment and provides internal compensation or correction without manual intervention.

Accordingly, a primary object of the present invention is to provide an improved circuit for generating a current waveform proportional to a control voltage.

Another object of the present invention is to provide an improved intensity control circuit.

Another object of the present invention is to provide a cathode ray tube circuit for generating an intensity control signal proportional to the beam velocity.

A further object of the present invention is to provide a novel circuit configuration for providing a high impedance input circuit.

Another object of the present invention is to provide a novel circuit configuration for controlling the intensity of a cathode ray tube as a function of the velocity or length of the vectors to be displayed.

Still another object of the present invention is to provide an improved intensity control circuit which does not require a nonlinear function generator.

A further object of the present invention is to provide a circuit configuration including a pair of amplifiers and a cathode resistor for effectively increasing the cathode degeneration effect of the circuit while maintaining a constant cathode impedance.

Other objects of the present invention will be pointed out in the following description and claims and illustrated in the accompanying drawings, which disclose, by way of example, the principle of the invention and the best mode, which has been contemplated, of applying that principle.

Figure 1:
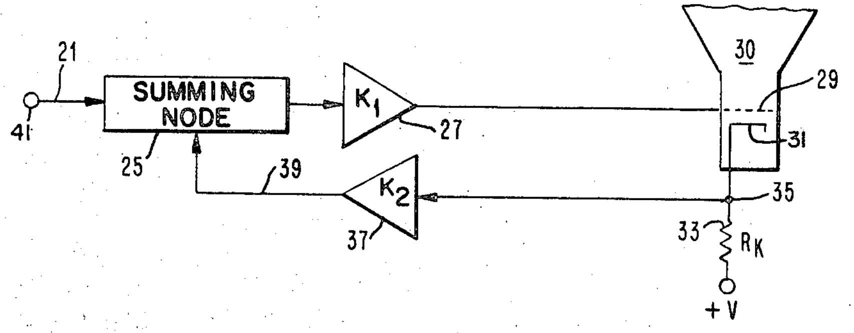
FIGURE 1 illustrates the present invention in block schematic form.

Referring now to the drawings and more particularly to FIGURE 1 thereof, a control signal in the form of a voltage indicative of the length or velocity of a vector to be displayed is applied from line 21 to a summing node 25, the output of which is connected through amplifier 27 labeled $K_1$ to control grid 29 of the cathode ray tube 30. The general characteristics of the input signal will be further defined in the ensuing description in terms of the environment described relative to FIGURE 3. The cathode 31 of CRT 30 is connected through resistor 33 designated $R_k$ to a source of reference potential. Connected between terminal 35 in the cathode circuit and summing node 25 is a feedback amplifier 37 designated $K_2$ and its associated output line 39. Thus the circuit shown in block form in FIGURE 1 includes a forward loop from summing node 25 to the control grid of the CRT, and a feedback loop from the cathode 31 of CRT 30 to summing node 25. The feedback loop connected to the cathode 31 of CRT 30 samples the voltage in the cathode of the CRT and effectively compares this sampled voltage with the control signal on line 21 applied to summing node 25. This circuit configuration is employed to provide a linear transfer function, i.e., a linear relationship between the cathode current $i_k$ and the input voltage $e_n$. If the input voltage drove the control grid of the CTR directly without cathode degeneration, the transfer function would be nonlinear. By providing cathode degeneration in the form of resistor 33, the transfer function becomes increasingly linear as the value of $R_k$ is increased. However, practical considerations such as capacity effects on response time, noise problems, power dissipation problems, etc., limit the size of $R_k$ to a nominal value. However, by inserting an amplifier 37 in the feedback loop, the resistor $R_k$ can be held to a practical value while simultaneously providing a high input impedance to an input signal as seen at input line 21 of the summing node 25. The input impedance is thus increased by some factor proportional to the amplification factor of amplifier $K_2$. By using a high gain amplifier for $K_2$, the impedance presented to an input signal would approach infinity. The methematical derivation of the transfer function as fully described hereinafter verifies this proposition. If the amplifier gains of $K_1$ and $K_2$ are sufficiently high, variations in the CRT transfer characteristic $e_g—i_k$ are effectively overridden and no provision need be made for circuit adjustment from one CRT to another except for the initial setting of the intensity level signals. The use of a logically derived signal proportional to velocity results in a much lower noise level and a more precisely shaped pulse having faster rise and fall times and less circuit delay than systems heretofore employed in the prior art.

The mathematical derivation of the transfer function of the circuit configuration of the present invention will now be defined in detail. Designating the voltage between the input to the CRT grid and the cathode as $e_g$, the voltage applied to amplifier $K_2$ as $e_f$, the output voltage from $K_1$ as $e_s$ and the output current from the CRT cathode as $i_k$, the derivation of transfer function may be mathematically shown by the following sequence of equations:

$$i_k=\frac{\mu e_g}{r_p+R_k}$$

or $$e_g=\frac{i_k(r_p+R_k)}{\mu} \quad (1)$$

$$e_g=e_s-i_kR_k \quad (2)$$

$$e_f=i_kR_k \quad (3)$$

$$e_s=K_1(e_{in}-K_{2ef})$$

Substituting (4) and (3) in (2)

$$e_g=K_1(e_{in}-K_2i_kR_k)-i_kR_k \quad (5)$$

Substituting (1) in (5)

$$\frac{i_k(r_p+R_k)}{\mu}=K_1(e_{in}-K_2i_kR_k)-i_kR_k \quad (6)$$

or $$i_k(r_p+R_k+\mu K_1K_2R_k+\mu R_k)=\mu K_1e_{in}$$

$$\frac{i_k}{e_{in}}=\frac{K_1}{\frac{r_p}{\mu}+\frac{R_k}{\mu}+(K_1K_2+1)R_k} \quad (7)$$

If $$(K_1K_2+1)R_k>>=\frac{r_p}{\mu}+\frac{R_k}{\mu}$$

which it will be in case of high gain amplifier, then $$\frac{i_k}{e_{in}}=\frac{K_1}{(K_1K_2+1)R_k} \quad (8)$$

If $$K_1K_2>>1$$

$$\frac{i_k}{e_{in}}=\frac{1}{K_2R_k} \quad (9)$$

Thus, the transfer function $i_k/e_{in}$ is inversely proportional to the product of the amplification factor of $K_2$ and the value of cathode resistor $R_k$.

Figure 2:
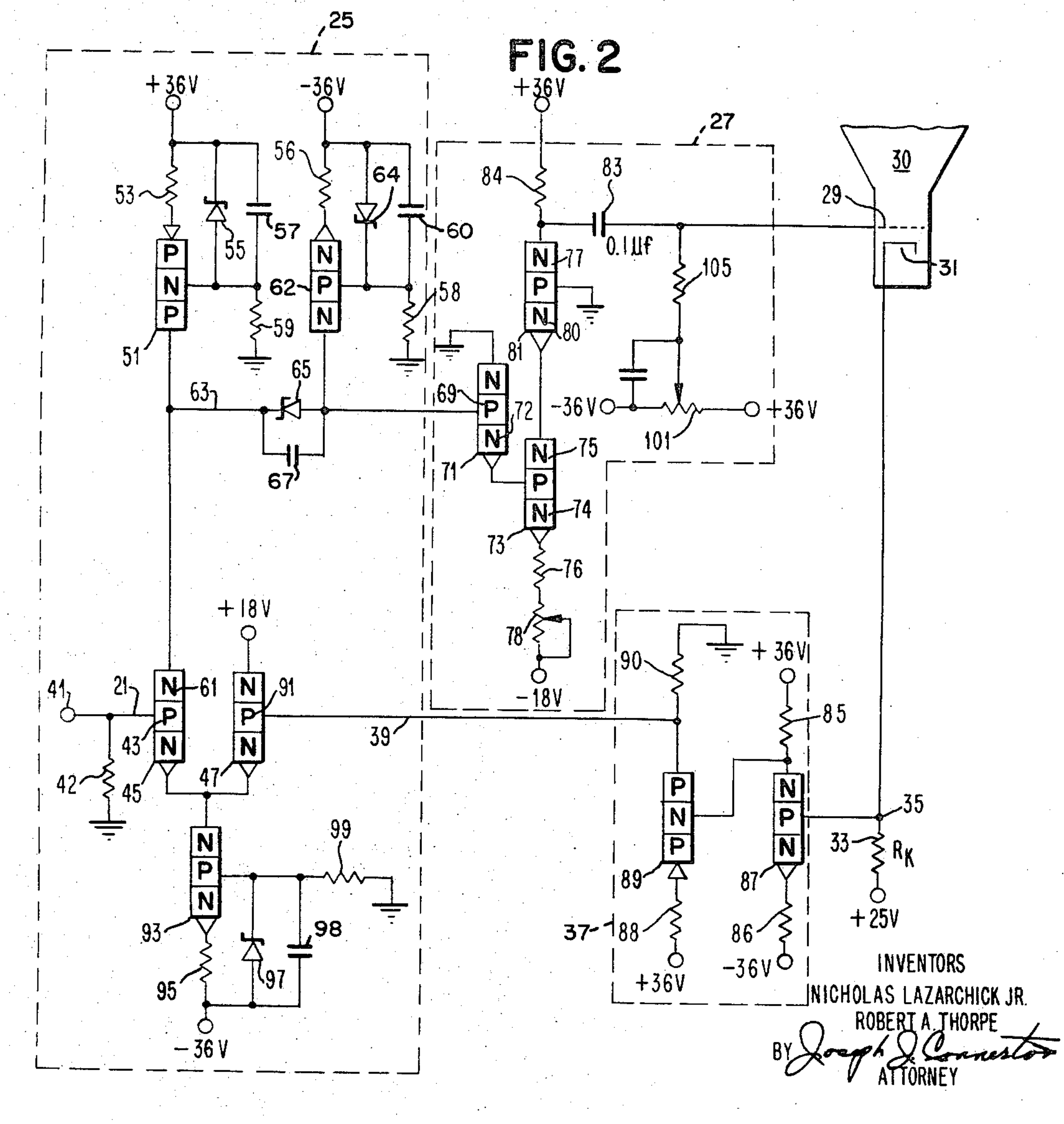
FIGURE 2 illustrates in schematic form details of the invention illustrated in block form in FIGURE 1.

Referring now to FIGURE 2, there is illustrated in schematic form the invention shown in block form in FIGURE 1. A current waveform signal more fully described hereinafter is applied to input terminal 41, and the resultant potential developed across resistor 42 is applied through conductor 21 to the base 43 of transistor 45. The resulting potential applied to base 43 initiates conduction of transistor 45 which, together with transistor 47 and associated circuitry, comprise the summing node 25 shown in block form in FIGURE 1. As more fully described hereinafter, the summing node 25 is effectively a voltage comparison circuit utilizing in the preferred embodiment a differential amplifier. Transistor 51, resistor 53, Zener diode 55, capacitor 57 and resistor 59 effectively comprise a constant current source.

In response to conduction in the positive input signal applied to base 43, transistor 45 is turned on, causing its collector 61 to become more negative and the resulting change of level on line 63 is applied through Zener diode 65 and shunt capacitor 67 to the base 69 of transistor 71. Zener diode 65 is employed to transfer the level shift from collector 61 of transistor 45 to the base 69 of the Darlington configuration. Since a constant current flow through a Zener is required for bias, the constant current source comprising transistor 51 and associated network is employed. However, this current level exceeds the capabilities of the Darlington configuration. Accordingly, the excess current is dissipated in a current sink comprising transistor 62, Zener diode 64, resistors 56, 58 and capacitor 60 connected between a source of —36 volts and ground. The current source and sink above described relate only to the D.C. bias conditions of the circuit and not the dynamic operating conditions. Transistors 71 and 73 are interconnected in a conventional Darlington configuration, and the negative signal from collector 61 applied to base 69 of transistor 71 turns transistor 71 off. The emitter 80 of transistor 81 is connected to the collector 75 of transistor 73, while the emitter 74 of transistor 73 is connected through resistor 76 and rheostat 78 to a source of negative potential. Resistor 76 and rheostat 78 are adjusted initially to provide the desired contrast on the CRT display. When transistor 71 is turned off in the manner above described, the resulting transition causes the collector 77 of transistor 81 to become more positive, and this positive transition is coupled through capacitor 83 to control grid 29 of CRT 30, thereby turning the beam on. The resulting cathode current through the cathode resistor 33 produces cathode degeneration, the resulting positive signal developed at terminal 35 being coupled through a two-stage amplifier comprising NPN inverter 87 and PNP inverter 89 to the base 91 of transistor 47. Effectively, the two-stage inverter circuit comprising transistors 87 and 89 and associated circuitry comprise the $K_2$ amplifier shown as block 37 in FIGURE 1. A constant current source comprising transistor 93, resistor 95, Zener diode 97, capacitor 98 and resistor 99 is directly coupled to the emitters of transistors 45 and 47. A brightness control circuit comprising rheostat 101 connected across a potential source, capacitor 103 and resistor 105 is used to adjust the display brightness to the desired level.

Transistors 47 and 45 comprise a differential amplifier which is used as the voltage summing node 25 in the preferred embodiment. The circuit configuration controlling the differential amplifier operates such that the input signal applied to the base 43 of transistor 45 will rise in an attempt to reach the level of the signal applied to the base of transistor 47. When the input signal is terminated and drops to its lower reference level, transistor 45 is turned off, causing the beam of the CRT to be turned off through the above described circuit. The reference signal then applied to the base 91 of transistor 47 drops to a corresponding level so that there is effectively no output from the summing node 25.

To complete the description of the preferred embodiment of the subject invention, the value of the components illustrated in FIGURE 2 are tabulated below.

| Component: | Value |
|---|---|
| Resistors— | |
| 33 ($R_k$) | 10K |
| 42, 76 | 1K |
| 53 | 1.27K |
| 56 | 1.57K |
| 58, 59, 99 | 3.6K |
| 84, 86, 88 | 3K |
| 85, 90 | 15K |
| 95 | 3.91K |
| 105 | 100K |
| Potentiometer 78 | 2K |
| Rheostat 101 | 10K |

Figure 3:
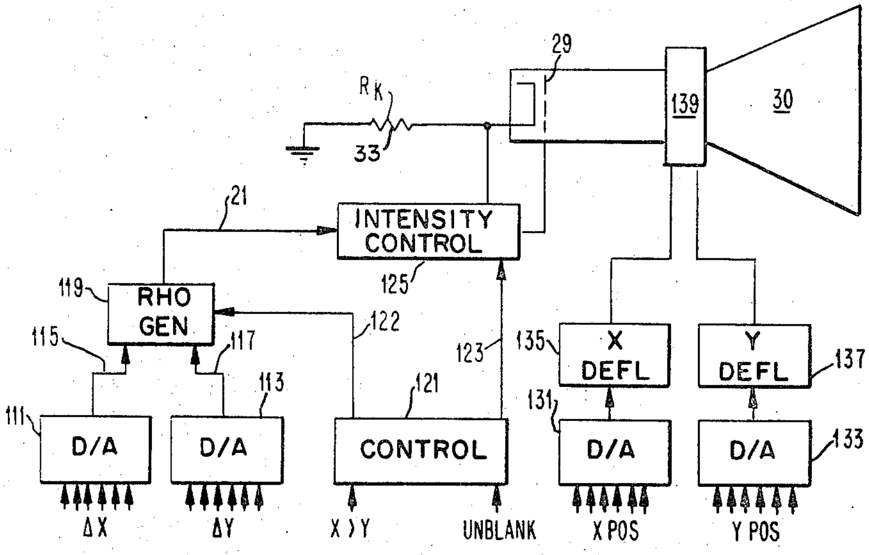
FIGURE 3 illustrates in block form a display environment of the present invention.

Referring now to FIGURE 3, the operation of the invention will be described in a display environment to clarify how a constant intensity signal is provided irrespective of vector length or beam velocity. The input to the system is a series of digital signals proportional to the change in the X position ($\Delta X$) and the Y position ($\Delta Y$). These signals are applied to digital to analog converters 111 and 113 wherein they are converted to corresponding analog signal representative of the change in X and Y positions on the CRT. These analog levels are applied through conductors 115 and 117 to a function generator 119, labeled Rho Generator, which generates an output signal proportional to the square root of the sum of the squares of $\Delta X$ and $\Delta Y$. Basically, an approximation signal is generated which consists of the larger of the Delta X or the Delta Y signals plus one-third the smaller Delta X or Delta Y. The associated data processing device determines which of the signals is the larger, and applies a signal indicative of this determination to the control element 121 on line labeled $X>Y$ which is then applied via line 122 to the Rho Generator 119. Additional details of the operation of the Rho Generator have been omitted as unnecessary to an understanding of the present invention and beyond the scope thereof. In addition, a digital unblanking signal is generated by the data processing unit and applied via the UNBLANK line through control unit 121 on line 123 to control whether or not a given line shall be intensified. The output of Rho Generator 119 is also connected through line 21 to the intensity control circuit 125, which basically includes amplifiers 27 and 37, the summing node 25 and the cathode degeneration circuit described with respect to FIGURE 1. Signals indicative of the X and Y positions of the beam are applied to digital to analog converters 131 and 133 and the resultant analog signals are combined with the existing deflection signals in deflection circuits 135 and 137 before being applied to the deflection yoke 139 of CRT 30.

Figure 4:
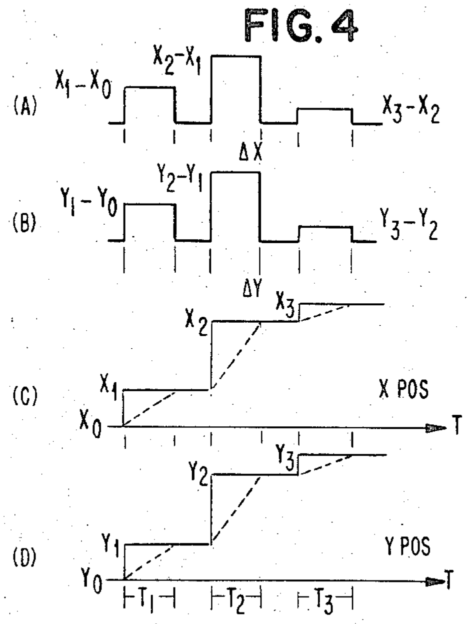
FIGURE 4 illustrates a family of waveforms for vector generation and intensity control.
Figure 5:
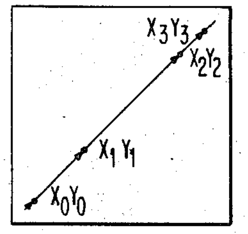
FIGURE 5 illustrates a typical CRT display utilizing the waveforms shown in FIGURE 4.

To facilitate an understanding of the present invention, reference will be made to FIGURES 4 and 5 to illustrate a specific display situation and the signals necessary thereto. Referring first to FIGURE 5, it is desired to generate a vector from the lower left portion of the screen identified by coordinates $X_0Y_0$ to the upper right position identified by coordinates $X_3Y_3$. Basically, the display system shown in FIGURE 3 and described above operates by dividing long vectors of the type shown in FIG. 5 into a series of shorter vectors. In the example herein described, three vectors have been selected for purposes of illustration, although the number of vectors employed is obviously a matter of design choice. To move from coordinate positions $X_0Y_0$ to $X_1Y_1$, the digital signals representative of $\Delta X$ and $\Delta Y$ shown in FIGURES 4A and 4B are applied to digital to analog decoders 111 and 113 to cause the heretofore described approximation signal to be generated by Rho Generator 119. The analog representation of these signals is shown in FIGURES 4A and 4B. The length of the vector between $X_1Y_1$ and $X_2Y_2$ is approximately twice that of the initial vector, but is accomplished in Time T2, identical to Time T1, the timing sequence being controlled by the associated data processing unit. Accordingly, at Time T2, the Delta X and Delta Y signals which are twice the amplitude of the corresponding signals generated at Time T1 are applied to the deflection coil 139 to cause the beam to move from position $X_1Y_1$ to $X_2Y_2$. At Time T3, the vector beam movement is only half the specified distance of the initial beam movement at Time T1. Accordingly, the signals shown at Time T3 in FIGURES 4A and 4B are applied from the Rho Generator to the intensity control system. FIGURES 4C and 4D illustrate the corresponding deflection waveforms which are generated by X and Y deflection circuits 135 and 137 before being applied to deflection yoke 139.

Summarizing the above, the subject invention provides an intensity control circuit which provides a linear transfer characteristic irrespective of variations in the transfer characteristics of the individual cathode ray tubes employed. By utilizing the direct approach to intensity control, the relatively complex function generators are eliminated together with the more difficult adjustment of these functions generators to compensate for the transfer characteristics of the individual cathode ray tubes utilized or replaced. Finally, the subject invention permits operation over a wide frequency band width resulting in improved rise time characteristics of the intensity pulse and increased clarity of display. The system as described is susceptible to direct computer control utilizing the timing system of the computer.

While the invention has been described in a display environment as an intensity control circuit, it may be applicable to any system requiring a current generated as a linear function of a control signal. The unique means of increasing the impedance of a cathode degeneration circuit described herein would also find varied circuit applications.

While the invention has been particularly shown and described with reference to preferred embodiments thereof, it will be understood by those skilled in the art that various changes in form and details may be made therein without departing from the spirit and scope of the invention.

What is claimed is:

1. In an intensity control system for a cathode ray tube display,
- a current generating circuit for generating a current linearly related to a control signal comprising in combination,
- an input circuit,
- a current generating device having control and output elements,
- said current generating device including an impedance connected to said output element,
- means connecting said input circuit to said control element of said current generating device whereby said impedance of said current generating device is reflected in said input circuit, and
- circuit means for directly coupling said output electrode of said current generating device to said input circuit,
- said coupling means including an amplifier connected between said impedance of said current generating device and said input circuit for effectively increasing said reflected input impedance of said current generating circuit.

2. A device of the character described in claim 1, wherein said means connecting said input circuit to said control element of said current generating device comprises an amplifier circuit.

3. In a cathode ray tube display system,
- an intensity control circuit for generating a beam current linearly related to a control potential to provide uniform intensity irrespective of beam velocity comprising in combination,
- an input circuit including a summing node,
- means for applying said control potential to said summing node,
- a current generating device having control and output elements,
- first amplifier means coupling said input circuit to said control element of said current generating device,
- an output circuit including an impedance element connected to said output element of said current generating device, and
- second amplifier means for directly coupling said output element of said current generating device to said summing node whereby the effective input impedance of said circuit is increased by the amplification factor of said second amplifier means.

4. An intensity control circuit for providing linear transfer characteristics irrespective of the transfer characteristics of the individual cathode ray tube comprising in combination:
- a cathode ray tube having control and output elements,
- a summing node having first and second inputs,
- means for applying a signal indicative of a vector length or velocity to said first input,
- an amplifier circuit interconnected between the output of said summing node and said control element of said cathode ray tube,
- a current generating circuit including a terminal and an impedance element connected to said output element for generating a current signal corresponding to said velocity indicating signal, and
- a feedback loop connected between said output terminal and said second input to said summing node for providing a high impedance to said first input.

5. A device of the character described in claim 4 wherein said summing node includes a differential amplifier circuit.

6. A device of the character described in claim 4 wherein said feedback loop includes a high gain amplifier which increases the effect of said impedance element in said output circuit according to the amplification factor of said amplifier.

7. A device of the character claimed in claim 6 wherein said output element comprises the cathode of said cathode ray tube and wherein said impedance element in said output circuit functions to provide cathode degeneration to the beam current of said cathode ray tube.

8. A circuit for controlling the intensity of a cathode ray tube as a function of beam velocity comprising in combination:
- an input circuit,
- a cathode ray tube having control and output elements,
- means for applying a control signal representative of beam velocity to said input circuit,
- means interconnecting said input circuit to said control element of said cathode ray tube,
- a circuit including an impedance device connected to said output element of said cathode ray tube,
- and means interconnecting said output circuit to said input circuit.

9. A device of the character described in claim 8 wherein said circuit connected to said output element of said cathode ray tube comprises a cathode degeneration circuit.

10. A device of the character claimed in claim 8 wherein said means interconnecting said output circuit to said input circuit comprises an amplifier for substantially increasing the effective impedance of said cathode degeneration circuit.

References Cited

UNITED STATES PATENTS

| | | | |
|---|---|---|---|
| 2,739,264 | 3/1956 | Shreve | 315—22 |
| 3,004,187 | 10/1961 | Olson | 315—22 |
| 3,155,917 | 11/1964 | Gelles | 330—85 |
| 3,191,090 | 6/1965 | Vitt | 315—22 |

RODNEY D. BENNETT, *Primary Examiner.*

T. H. TUBBESING, *Assistant Examiner.*